United States Patent
Maki

(10) Patent No.: US 8,339,629 B2
(45) Date of Patent: Dec. 25, 2012

(54) DATA PROCESSING DEVICE, COMMUNICATION PROCESSING METHOD, AND COMPUTER PROGRAM

(75) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1265 days.

(21) Appl. No.: 11/181,768

(22) Filed: Jul. 15, 2005

(65) Prior Publication Data

US 2006/0017964 A1 Jan. 26, 2006

(51) Int. Cl.
*G06K 15/00* (2006.01)
*G06F 3/12* (2006.01)
(52) U.S. Cl. ........................ 358/1.14; 358/1.15
(58) Field of Classification Search ............... 358/1.15, 358/1.14
See application file for complete search history.

(56) References Cited

U.S. PATENT DOCUMENTS 6,665,088 B1 * 12/2003 Chiba et al. ............. 358/1.17
2002/0054222 A1 * 5/2002 Nitta et al. ............... 348/231

FOREIGN PATENT DOCUMENTS

| JP | 11-261619 | 9/1999 |
| JP | 2000-115241 | 4/2000 |
| JP | 2004-64665 | 2/2004 |

* cited by examiner

*Primary Examiner* — Steven Kau
*Assistant Examiner* — Neil R McLean
(74) *Attorney, Agent, or Firm* — Fitzpatrick, Cella, Harper & Scinto

(57) ABSTRACT

To prevent a situation that an external device cannot confirm that a data processing device cannot execute data reception, the data processing device first notifies the external device of a first data size capable of being received by the data processing device and then notifies the external device a second data size larger than the first data size.

7 Claims, 6 Drawing Sheets

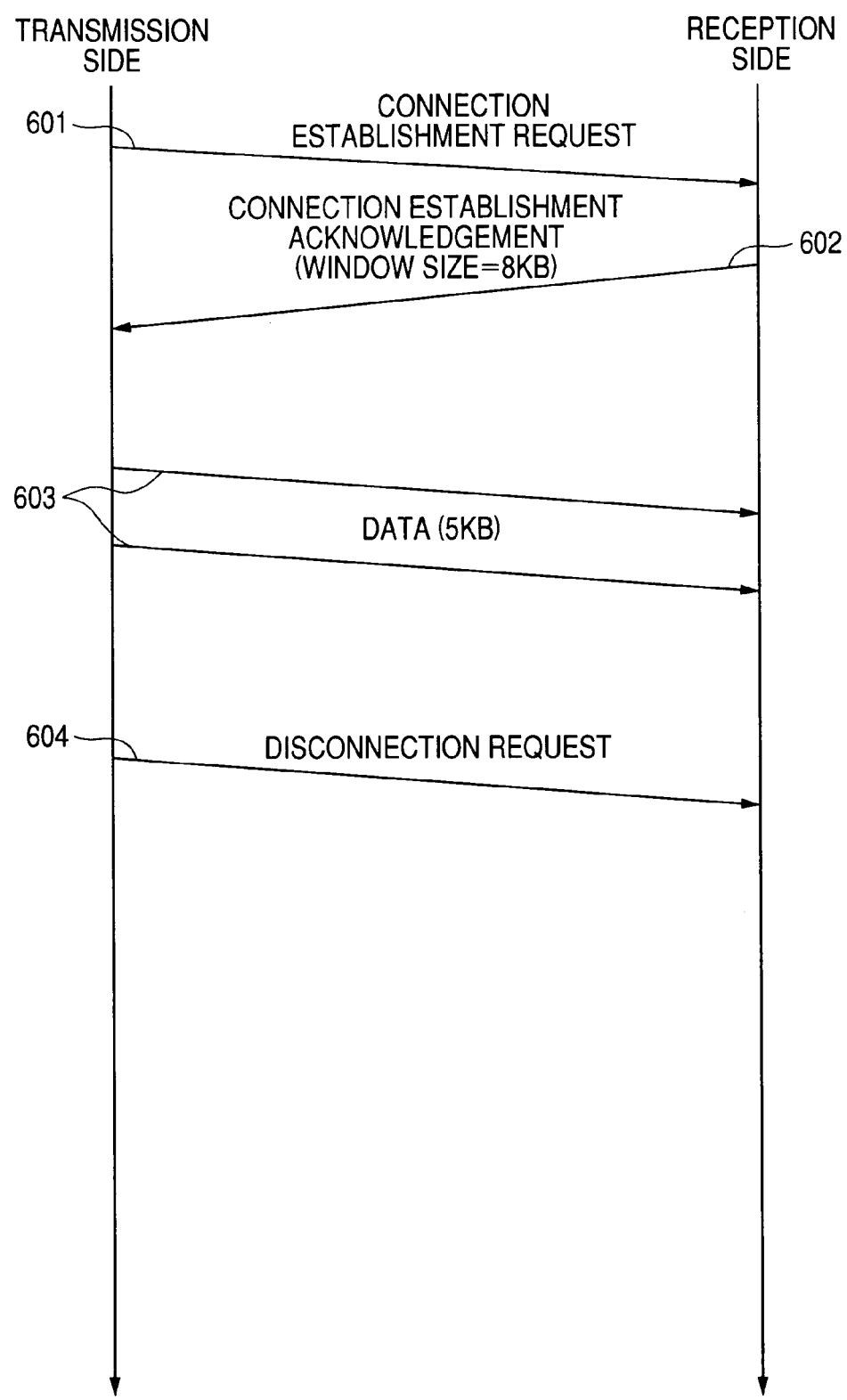

DATA PROCESSING DEVICE, COMMUNICATION PROCESSING METHOD, AND COMPUTER PROGRAM

BACKGROUND OF THE INVENTION

1. Field of the Invention

The present invention relates to a data processing device which communicates with an external device, a communication processing method which is adopted by the relevant data processing device, and a computer program which is used to cause the relevant data processing device to execute the relevant communication processing method.

2. Related Background Art

Conventionally, a communication method in which flow control is executed by using a window size is known (for example, Japanese Patent Application Laid-Open Nos. H11-261619 and 2004-064665).

More specifically, a data processing device on the data reception side secures the reception buffer corresponding to the window size, temporarily stores the data transferred from the data transfer (or transmission) side, and holds the stored data until a read request is issued based on an application program.

Then, if the data process based on the application program delays and thus the reception buffer is filled with the stored data before the read request is issued, the data processing device on the data reception side notifies the transfer side that the window size is "0". Thus, the data transfer from the data transfer side is suppressed.

Incidentally, even if an acknowledgement (or confirmatory response) packet (hereinafter simply called an acknowledgment) is not transferred from the data processing device on the data reception side, the transfer side can transfer the data of the size indicated by the window size. For this reason, the number of acknowledgments can be made less by just that much, whereby it is possible to increase communication efficiency as much as the window size is made larger.

However, for example, in some communication methods of connection type in which TCP (Transmission Control Protocol) is used, after the connection between the transfer side and the data processing device on the reception side was established, the transfer side immediately starts transferring print data and then normally ends the operation as soon as it ends the transmission of the print data.

For example, as shown in FIG. 6, in a case where the window size is eight kilobytes (KB) and the data size of the print data to be transferred is five kilobytes, if the transfer side transfers a connection establishment request packet (hereinafter called a connection establishment request) and the data processing device on the reception side transfers a connection establishment acknowledgment packet (hereinafter called a connection establishment acknowledgment) to establish the connection between the transfer side and the data processing device on the reception side, then the transfer side immediately ends the data transfer. This is because the window size included in the connection establishment acknowledgment is larger than the data size of the print data to be transferred, and thus the data of five kilobytes is completely held in the reception buffer. Thus, as soon as the transfer side ends the transfer the print data and transfers a disconnection request packet (hereinafter called a disconnection request) indicating the end of the connection, it judges that the transfer of the print data normally ends.

Meanwhile, in a case where the data processing device on the reception side confirms, according to the establishment of the connection, whether or not an error occurs, it sometimes confirms that the error by which it is necessary to refuse printing of the transferred print data occurs. In such a case, the data processing device disconnects the established connection and discards the data held in the reception buffer. Therefore, in a case where the transfer side can detect that the established connection is disconnected by the data processing device on the way to transferring the data, the transfer side can judge that it fails to transfer the print data.

However, as shown in FIG. 6, in the case where the data of which the size is smaller than the window size is transferred, the transfer side immediately ends the data transfer. For this reason, there is a fear that the transfer side judges that the transfer of the print data normally ends before it confirms that the error occurs on the side of the data processing device. In such a case, there is a possibility that, although a user believes that the print data has been transferred without accident, the printing based on the print data is not actually executed. In addition, there is a possibility that the transferred data itself has been discarded by the data processing device on the reception side.

To cope with such inconvenience, if the window sizes are uniformly reduced, the transfer side can instantly detect that an error occurs in the data processing device on the reception side. However, in that case, if the data transfer is continuously executed by using the small window size, the number of times of transferring acknowledgments remarkably increases, whereby communication efficiency seriously degrades.

SUMMARY OF THE INVENTION

Consequently, an object of the present invention is to reduce a conventional problem that a data transfer side cannot detect a refusal of data reception by a data processing device on a reception side because data transfer immediately ends.

To achieve the above object, a data processing device according to the present invention is characterized by comprising: a first notification unit adapted to notify an external device of a first data size as a data size capable of being received by the data processing device; a judgment unit adapted to judge whether to refuse printing or data reception; a refusal unit adapted to, in a case where it is judged by the judgment unit to refuse the printing or the data reception, execute a process for refusing the data reception from the external device; and a second notification unit adapted to, in a case where it is not judged by the judgment unit to refuse the printing or the data reception, notify the external device of a second data size larger than the first data size after the first notification unit notified the external device of the first data size.

Further, a data processing device according to the present invention is characterized by comprising: a data storage unit adapted to store data received from an external device; a first setting unit adapted to set a first data size as a size of the data storage unit; a judgment unit adapted to judge whether to refuse printing or the data reception; a refusal unit adapted to, in a case where it is judged by the judgment unit to refuse the printing or the data reception, execute a process for refusing the data reception from the external device; and a second setting unit adapted to, in a case where it is not judged by the judgment unit to refuse the printing or the data reception, set as the size of the data storage unit a second data size larger than the first data size.

Furthermore, a communication processing method applied by a data processing device, according to the present invention, is characterized by comprising: a first notification step of notifying an external device of a first data size as a data size capable of being received by the data processing device; a refusal step of, in a case where the data reception from the external device does not continue, executing a process for refusing the data reception from the external device; and a second notification step of, in a case where the data reception continues, notifying the external device of a second data size larger than the first data size after the first data size was notified in the first notification step.

Furthermore, a communication processing method applied by a data processing device, according to the present invention, is characterized by comprising: a first setting step of setting a first data size as a size of a storage area in which data received from an external device is stored; a refusal step of, in a case where the data reception from the external device does not continue, executing a process for refusing the data reception from the external device; and a second setting step of, in a case where the data reception from the external device continues, setting as the size of the storage area a second data size larger than the first data size.

BRIEF DESCRIPTION OF THE DRAWINGS

FIG. 6 is a sequence view indicating a communication process.

DETAILED DESCRIPTION OF THE PREFERRED EMBODIMENTS

Embodiment 1

Hereinafter, the embodiment of the present invention will be described in detail with reference to the attached drawings.

Figure 1:
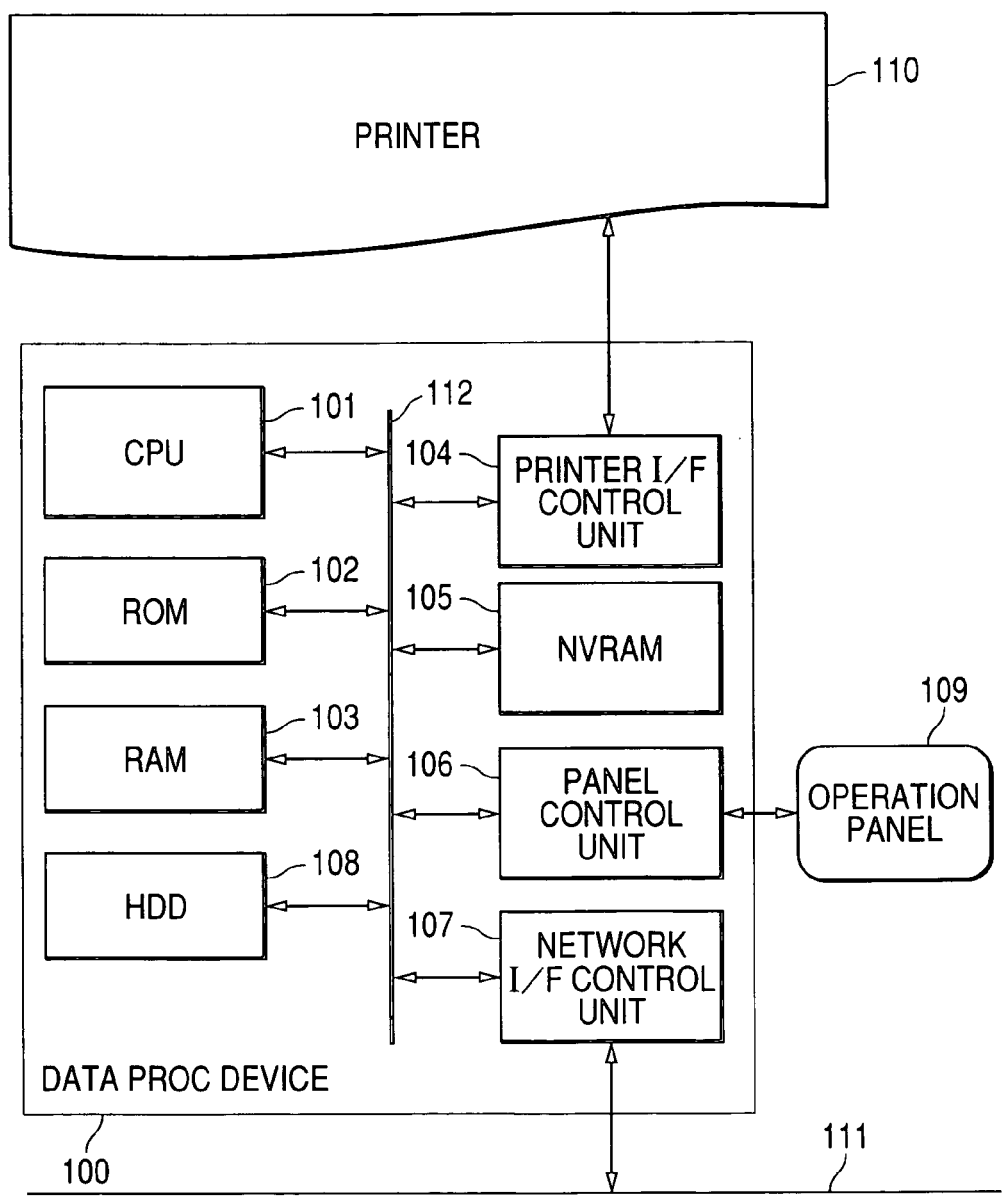
FIG. 1 is a block diagram showing the hardware structure of a data processing device 100 according to the present invention.

FIG. 1 is a block diagram showing the hardware structure of a data processing device 100 according to the present invention. A CPU 101 controls a whole device in accordance with software programs concerned with the data processing device. A ROM 102, which is a read only memory, stores a boot program of the device, fixed parameters and the like. A RAM 103, which is a random access memory, stores data temporarily used when the CPU 101 controls the device.

A printer I/F control unit 104 controls an I/F between the data processing device and a printer (or printer engine) 110. The data processing device 100 shown in FIG. 1, which is connected to the printer 110, controls the printer 110. However, it is not limited to control the printer 110.

An NVRAM 105, which is a non-volatile memory, stores various setting values of the data processing device. A panel control unit 106, which controls an operation panel 109, controls to display various information and input instructions from a user.

A network I/F control unit 107 controls the transmission/reception of data performed through a LAN 111. An HDD 108, which is a hard disk drive, stores various data such as print data and the like.

The operation panel 109 performs to display the various information and input the instructions from the user. The printer 110 prints an image on a recording medium on the basis of data from the data processing device 100. A bus 112, which connects the CPU 101, the ROM 102, the RAM 103, the printer I/F control unit 104, the NVRAM 105, the panel control unit 106, the network I/F control unit 107 and the HDD 108 each other, is a system bus used for transferring a control signal from the CPU 101 and data signals exchanged among respective units.

The LAN 111 is a local area network, to which the data processing device and other external devices such as a PC (personal computer), a host computer and the like are connected. The data processing device 100 receives print data transferred by the PC through the LAN 111.

Figure 2:
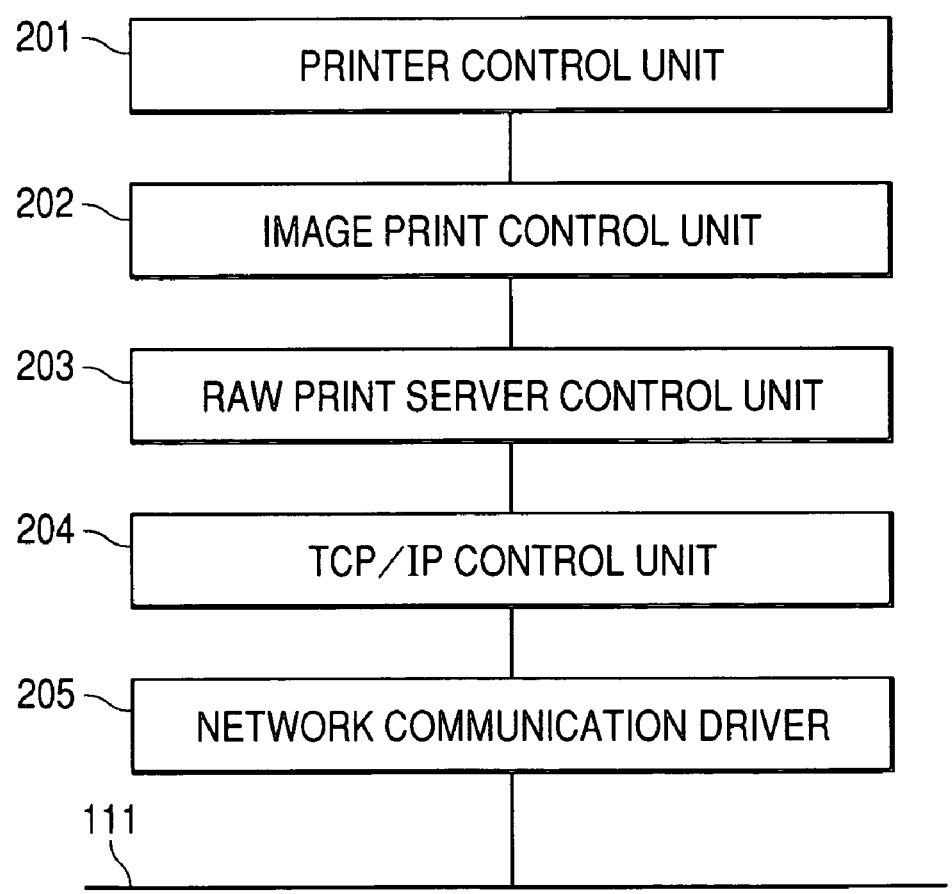
FIG. 2 is a block diagram showing the software structure of software programs of the data processing device 100.

FIG. 2 is a block diagram showing the software structure of software programs of the data processing device 100. Programs of respective modules in FIG. 2 are executed by one or plural CPU's (for example, CPU 101) in the data processing device 100.

A printer control unit 201, which is a module for controlling the printer I/F control unit 104, transfers image data to the printer 110 and controls the sheet feeding, the sheet discharging and the like performed in the printer 110.

An image print control unit 202, which is a module for converting the received print data into image data which can be print processed in the printer 110, controls the print of plural copies, the print of both faces and the like.

A RAW print server control unit 203 controls a reception process of data according to a RAW print protocol, delivers the received data to the image print control unit 202 and performs controls of disconnecting the connection by detecting an error and refusing a print process instructed from a specific host computer.

A TCP/IP (Transmission Control Protocol/Internet Protocol) control unit 204, which is a module for controlling the TCP/IP, controls the transmission/reception of data according to the TCP/IP by using a network communication driver 205.

The network communication driver 205, which controls the network I/F control unit 107, controls the transfer of signals between the LAN and the network communication driver 205.

Figure 3:
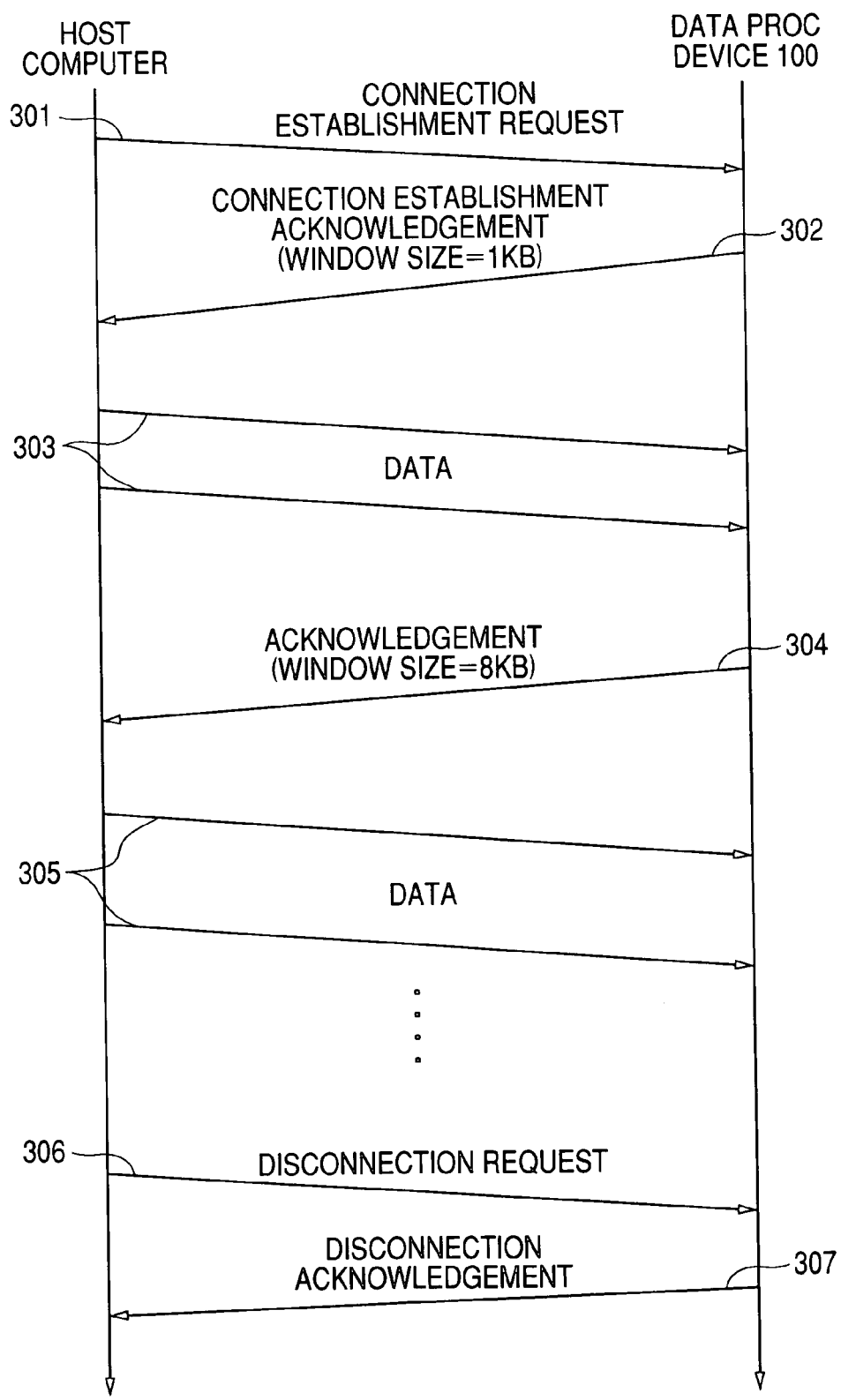
FIG. 3 is a sequence view indicating a communication process to be executed between a host computer and the data processing device 100.

Hereinafter, communication processes according to the present invention will be explained. The following communication processes are executed under the controls of the respective modules shown in FIG. 2. FIG. 3 is a sequence view indicating a communication process to be executed between the host computer and the data processing device 100. It is assumed that the host computer and the data processing device 100 are respectively connected to the LAN 111 shown in FIG. 1. In this communication process, the host computer transfers the print data to the data processing device 100.

Initially, the host computer transfers a connection establishment request to the data processing device 100 (301). For this action, the data processing device 100 transfers a connection establishment acknowledgement for the connection establishment request to the host computer (302). For this connection establishment acknowledgement, a window size equal to 1KB is designated.

The window size corresponds to the size of a reception buffer secured in the RAM 103 by the data processing device 100 for this connection. In other words, the window size indicates the data size which can be received by the data processing device 100. The host computer can transfer data, of which the size is indicated by the window size, to the data processing device 100 even if the acknowledgement is not transferred from the data processing device 100.

The host computer starts to transfer data to the data processing device 100 (303). In the connection establishment acknowledgement denoted by the reference numeral 302, since the window size becomes 1KB, the host computer stops to transfer the data for the moment when the data of 1KB is transferred.

On the other hand, the connection is established, the data processing device 100 judges whether or not a phenomenon that a print process has to be refused occurs.

When it is judged that the relevant phenomenon does not occur, the data processing device 100 secures a reception buffer of 8KB in the RAM 103, and in case of notifying the next acknowledgement to the host computer, the acknowledgement, for which a window size equal to 8KB is designated, is notified to the host computer (305). In this case, the window size becomes 8KB. Then, the host computer can transfer data of which the size is limited to 8KB (306).

Thereafter, the host computer repeats the transfer of the data to the data processing device 100, and then the host computer transfers a disconnection request to the data processing device 100 after terminating the transfer of the data. Responding to the disconnection request, the data processing device 100 transfers a disconnection acknowledgement packet (hereinafter, called a disconnection acknowledgement) to the host computer and then the connection is disconnected.

In FIG. 3, since the phenomenon that the print process has to be refused did not occur, the communication efficiency in the data transfer to be performed thereafter could be improved by enlarging the window size.

Figure 4:
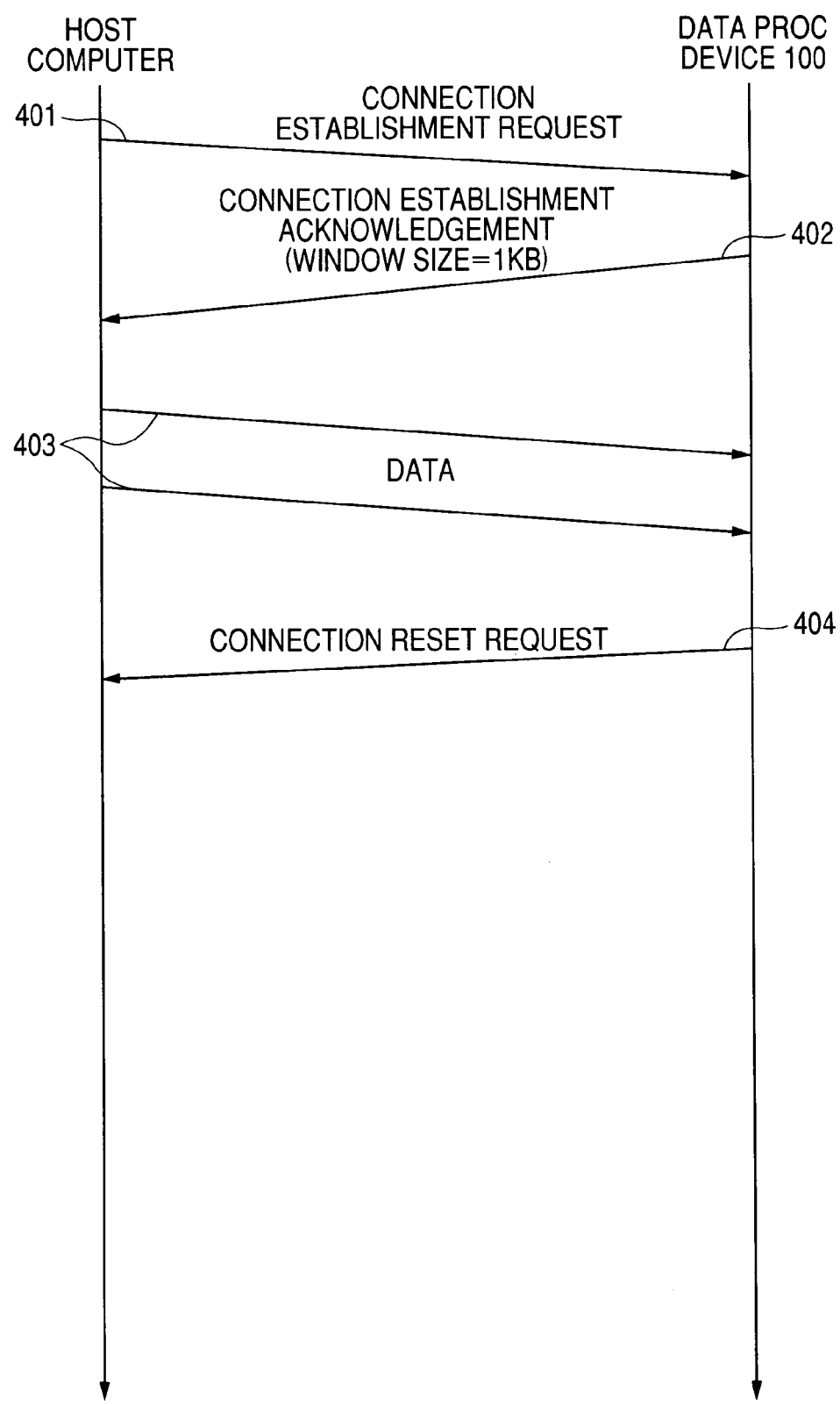
FIG. 4 is a sequence view indicating a communication process in case where a phenomenon that a print process has to be refused occurs.

Meanwhile, a communication process in a case where the phenomenon that the print process has to be refused occurs will be explained. FIG. 4 is a sequence view indicating the communication process in case where the phenomenon that the print process has to be refused occurs.

Initially, the host computer transfers the connection establishment request to the data processing device 100 (401). For this action, the data processing device 100 transfers the connection establishment acknowledgement for the connection establishment request to the host computer (402). For this connection establishment acknowledgement, the window size equal to 1KB is designated.

The host computer starts to transfer the data to the data processing device 100 (303). In the connection establishment acknowledgement denoted by the reference numeral 302, since the window size becomes 1KB, the host computer stops to transfer the data for the moment when the data of 1KB is transferred.

On the other hand, the connection is established, the data processing device 100 judges whether or not the phenomenon that the print process has to be refused occurs.

When it is judged that the relevant phenomenon occurs, the data processing device 100 transfers a connection reset request packet (hereinafter, called a connection reset request) of unilaterally requesting the disconnection to the host computer (404).

In the connection establishment acknowledgment, since the window size becomes 1KB, the host computer can confirm the connection reset request as long as the size of data to be transferred is larger than 1KB. Therefore, the host computer can judge that the transfer of the print data is abnormally terminated and can notify the abnormal termination to a user if necessary.

Figure 5:
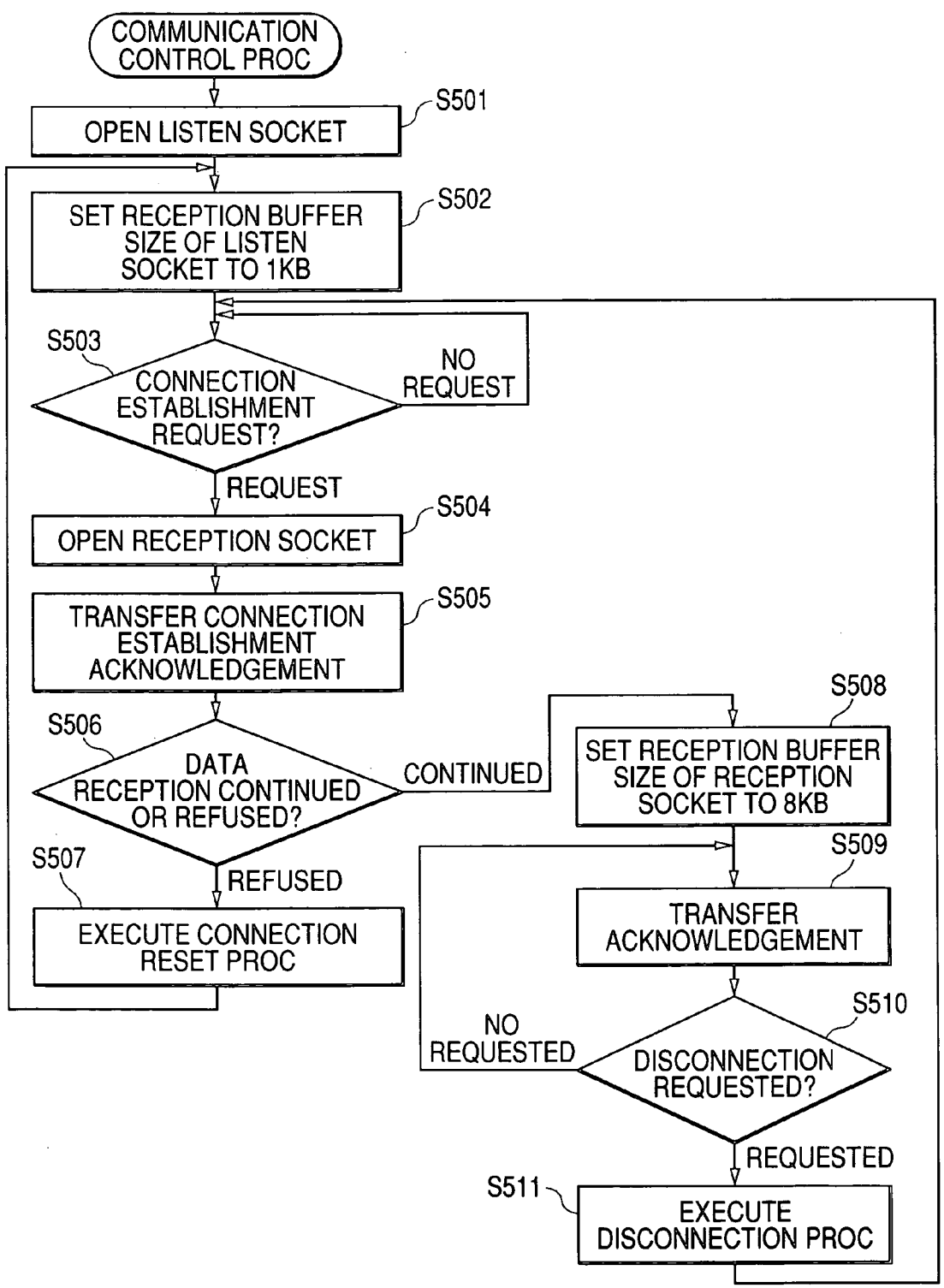
FIG. 5 is a flowchart indicating a communication control process to be executed in the data processing device 100 in order to execute the communication processes indicated in FIGS. 3 and 4.

FIG. 5 is a flowchart indicating a communication control process to be executed in the data processing device 100 in order to execute the communication processes indicated in FIGS. 3 and 4. The communication control process is executed under the controls of the respective modules shown in FIG. 2.

When the RAW print server control unit 203 is started up, the RAW print server control unit 203 opens a listen socket between the RAW print server control unit 203 and the TCP/IP control unit 204 (step S501). The listen socket is a socket which is used for accepting the connection establishment request from the external device, and the No. 9100 port of the TCP is used for the listen socket. After the listen socket was opened, the RAW print server control unit 203 sets the reception buffer size corresponding to the listen socket to 1KB (step S502).

Next, the TCP/IP control unit 204 judges whether or not the connection establishment is requested from the external device (step S503), and when the connection establishment is requested from the host computer, the TCP/IP control unit 204 automatically opens a reception socket (step S504). The reception socket is a socket which is used for receiving data. Since the setting of the listen socket is thereafter taken over the reception socket, the size of the reception buffer corresponding to the reception socket becomes 1KB.

At the same time that the reception socket is opened, the TCP/IP control unit 204 transfers the connection establishment acknowledgment, for which the window size equal to 1KB is designated, to the host computer (step S505).

According to the above operation, when the connection is established, the data processing device 100 receives the data to be transferred by the host computer. In parallel with the above operation, the RAW print server control unit 203 judges whether the reception of the data is continued or refused for this connection (step S506). In case of occurring an error that the print process has to be refused, for example, an error of disabling the print process, or in case of the connection establishment request from the host computer targeted to refuse the print process, it is judged to refuse the reception of the data.

When it is judged to refuse the reception of the data, a connection reset process is executed (step S507). In the connection reset process, the RAW print server control unit 203 closes the reception socket, and the TCP/IP control unit 204 transfers the connection reset request to the host computer. Accordingly, the host computer can confirm a refusal of the data reception indicated by the data processing device 100 when transferring the data of 1KB comparatively a little amount of data.

When the RAW print server control unit 203 judges that the data reception is continued, the reception buffer size corresponding to the reception socket is set to 8KB (step S508), and the TCP/IP control unit 204 transfers the acknowledgment, for which the window size equal to 8KB is designated, to the host computer (step S509).

The data processing device 100 continues to receive the data transferred from the host computer. While, the TCP/IP control unit 204 judges whether or not the disconnection is requested (step S510).

When the disconnection is requested, a disconnection process is executed (step S511). In the disconnection process, the RAW print server control unit 203 closes the reception socket, and the TCP/IP control unit 204 transfers a connection termination acknowledgment to the host computer.

In FIGS. 3, 4 and 5, although the window size designated for the connection establishment acknowledgement was 1KB, if the window size designated for the connection establishment acknowledgment to be transferred in the step S505 is smaller than the window size designated for the acknowledgment to be transferred in the step S509, it may be larger than 1KB, or may be 0KB (zero kilobyte). In case of 0KB, the data processing device 100 can conduct the judgment in the step S506 before the host computer starts to transfer the data.

The present invention is not limited to the device of the above embodiment but the present invention is applicable to a system composed of plural equipments or to a device including single equipment. It is needless to say that an object of the present invention can be completed by a case where a storage medium storing the program codes of software for realizing the functions of the above embodiment is supplied to a system or a device and then a computer (CPU or MPU) in the system or the device reads and executes the program codes stored in the storage medium.

In this case, the program codes themselves read from the storage medium realize the functions of the above embodiment, and the storage medium storing the relevant program codes constitute the present invention. As the storage medium for supplying the program codes, for example, a Floppy™ disk, a hard disk, an optical disk, a magnetooptical disk, a CD-ROM, a CD-R, a magnetic tape, a non-volatile memory card, a ROM or the like can be used.

It is needless to say that the present invention includes not only a case where the functions of the above embodiment are realized by executing the program codes read by the computer but also a case where an OS (operating system) or the like functioning on the computer executes all the process or a part thereof according to instructions of the program codes, thereby realizing the functions of the above embodiment.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of the relevant program codes, thereby realizing the functions of the above embodiment.

According to the present invention, in a case that the reception of data from an external device is continued after notifying the first data size to the external device as the data size which can be received by the data processing device, the deterioration of communication efficiency in the data transfer can be decreased after enabling the external device to confirm that the data reception can not be performed by the data processing device by notifying the second data size larger than the first data size to the external device.

In another case that the reception of data from the external device is continued after setting the first data size as the size of a storage area for storing the data from the external device, the deterioration of communication efficiency in the data transfer can be decreased after enabling the external device to confirm that the data reception can not be performed by the data processing device by setting the second data size larger than the first data size as the size of the storage area.

This application claims priority from Japanese Patent Application No. 2004-213018 filed on Jul. 21, 2004, which is hereby incorporated by reference herein.

What is claimed is:
1. A data processing device comprising:
  a request reception unit configured to receive a request for connection from an external device;
  a receiving unit configured to receive print data from the external device, in a case where a connection with the external device has been established;
  a first notification unit configured to, in response to the request for connection, notify the external device of a first data size which is set to be smaller than a data size capable of being received by said receiving unit;
  a judgment unit configured to judge whether said data processing device can perform printing;
  a refusal unit configured to, in a case where said receiving unit receives first data of the first data size being a part of the print data and said judgment unit judges that said data processing device cannot perform printing, transmit a request for disconnecting the established connection before transmission of the print data by the external device is completed; and
  a second notification unit configured to, in a case where said receiving unit receives the first data of the first data size being a part of the print data and said judgment unit judges that said data processing device can perform printing, notify the external device of a second data size which is larger than the first data size and which is capable of receiving second data of the print data which follows the first data.

2. A data processing device according to claim 1, wherein said first notification unit transmits to the external device, in a case where said request reception unit receives the request for connection, a connection establishment acknowledgment, including the first data size, corresponding to the request for connection.

3. A data processing device according to claim 1, further comprising a connection establishment unit configured to execute a process for establishing the connection with the external device,
  wherein said refusal unit transmits to the external device a request for disconnecting the established connection established by said connection establishment unit.

4. A data processing device according to claim 3, wherein said judgment unit judges whether said data processing device can perform printing, in accordance with the connection being established by said connection establishment unit.

5. A data processing device according to claim 1, wherein the first data size is zero.

6. A communication processing method applied by a data processing device, said method comprising:
  a request reception step of receiving a request for connection from an external device;
  a receiving step of receiving data from the external device by a receiving unit, in a case where a connection with the external device has been established;
  a first notification step of, in response to the request for connection, notifying the external device of a first data size which is set to be smaller than a data size capable of being received by the receiving unit;
  a receiving step of receiving print data from the external device by the receiving unit;
  a judgment step of judging whether the data processing device can perform printing;
  a refusal step of, in a case where first data size first data of the first data size being a part of the print data is received in said receiving step and it is judged in said judgment step that the data processing device cannot perform printing, transmitting a request for disconnecting the established connection before transmission of the print data by the external device is completed; and
  a second notification step of, in a case where the first data of the first data size being a part of the print data is received in said receiving step and it is judged in said judgment step that the data processing device can perform printing, notifying the external device of a second data size which is larger than the first data size and which is capable of receiving second data of the print data which follows the first data.

7. A non-transitory computer program stored in an apparatus-readable storage medium, the computer program causing a data processing device to execute a communication processing method according to claim 6.

* * * * *